United States Patent
Song

(10) Patent No.: US 8,044,438 B2
(45) Date of Patent: Oct. 25, 2011

(54) LIQUID CRYSTAL DISPLAY AND SUBSTRATE THEREOF

(75) Inventor: Jang-Kun Song, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/787,000

(22) Filed: May 25, 2010

(65) Prior Publication Data

US 2010/0231839 A1     Sep. 16, 2010

Related U.S. Application Data

(63) Continuation of application No. 11/066,764, filed on Feb. 28, 2005, now Pat. No. 7,723,727, which is a continuation of application No. 09/935,158, filed on Aug. 23, 2001, now Pat. No. 6,870,588.

(30) Foreign Application Priority Data

Nov. 29, 2000 (KR) .............................. 2000-71681

(51) Int. Cl.
*H01L 29/76* (2006.01)
(52) U.S. Cl. ............ 257/207; 257/208; 257/59; 257/72; 257/E21.656; 349/39; 349/54; 349/144; 349/146
(58) Field of Classification Search .............. 257/207, 257/208, 59, 72, E21.656; 349/39, 54, 144, 349/146
See application file for complete search history.

(56) References Cited

U.S. PATENT DOCUMENTS

| | | | |
|---|---|---|---|
| 5,274,476 A | 12/1993 | Lee | |
| 5,349,226 A | 9/1994 | Kawaguchi et al. | |
| 5,406,398 A | 4/1995 | Suzuki et al. | |
| 5,598,283 A | 1/1997 | Fujii et al. | |

(Continued)

FOREIGN PATENT DOCUMENTS

EP           0558134 A2     9/1993

(Continued)

*Primary Examiner* — Eugene Lee
(74) *Attorney, Agent, or Firm* — F. Chau & Associates, LLC

(57) ABSTRACT

Disclosed are a liquid crystal display and a substrate for the same. The substrate comprises first wires formed in one direction on the substrate; second wires intersecting and insulated from the first wires; pixel electrodes formed in pixel regions defined by the first wires and the second wires; and switching elements connected to the first wires, the second wires and the pixel electrodes, wherein an interval between two adjacent second wires has a predetermined dimension that repeatedly varies from one set of adjacent second wires to the next, and a side of the pixel electrodes adjacent to the second wires is shaped in a pattern identical to the second wires such that the pixel electrodes have a wide portion and a narrow portion. The liquid crystal display comprises a first substrate; first wires formed in one direction on the first substrate; second wires intersecting and insulated from the first wires; pixel electrodes formed in pixel regions defined by the crossing of the first wires and the second wires, and a side of the pixel electrodes adjacent to the second wires is shaped in a pattern identical to the second wires such that the pixel electrodes have a wide portion and a narrow portion; switching elements connected to the first wires, the second wires and the pixel electrodes; a second substrate provided opposing the first substrate; a black matrix formed on the second substrate; common electrodes formed on the second substrate; and domain controlling means for controlling the formation of domains of the pixel electrodes.

14 Claims, 6 Drawing Sheets

U.S. PATENT DOCUMENTS

| | | | |
|---|---|---|---|
| 5,742,074 A | 4/1998 | Takizawa et al. | |
| 5,946,068 A | 8/1999 | Lee et al. | |
| 5,953,088 A | 9/1999 | Hanazawa et al. | |
| 5,953,093 A | 9/1999 | Hirata et al. | |
| 5,966,189 A * | 10/1999 | Matsuo | 349/38 |
| 6,052,171 A | 4/2000 | Kawaguchi | |
| 6,078,365 A * | 6/2000 | Ueda et al. | 349/43 |
| 6,078,366 A | 6/2000 | Dohjo et al. | |
| 6,172,729 B1 | 1/2001 | Ikeda | |
| 6,198,516 B1 | 3/2001 | Kim et al. | |
| 6,256,077 B1 | 7/2001 | Baek | |
| 6,266,118 B1 | 7/2001 | Lee et al. | |
| 6,317,176 B1 | 11/2001 | Kim et al. | |
| 6,335,771 B1 | 1/2002 | Hiraishi | |
| 6,407,794 B2 | 6/2002 | Koma | |
| 6,587,174 B1 | 7/2003 | Nakano | |
| 6,639,640 B1 | 10/2003 | Matsuoka et al. | |
| 6,724,452 B1 | 4/2004 | Takeda et al. | |
| 6,741,314 B2 | 5/2004 | Song | |
| 6,870,588 B2 | 3/2005 | Song | |
| 2003/0011729 A1 | 1/2003 | Song et al. | |
| 2003/0107694 A1 | 6/2003 | Song | |

FOREIGN PATENT DOCUMENTS

| | | |
|---|---|---|
| EP | 0884626 A2 | 12/1998 |
| EP | 0884626 A3 | 12/1998 |
| JP | 08-179341 | 7/1996 |
| JP | 10-142577 | 5/1998 |
| JP | 10186330 | 7/1998 |
| JP | 10-232392 | 9/1998 |
| JP | 10-333170 | 12/1998 |
| JP | 11-242244 | 9/1999 |
| JP | 11-337971 | 12/1999 |
| JP | 2000-131717 | 5/2000 |

* cited by examiner

LIQUID CRYSTAL DISPLAY AND SUBSTRATE THEREOF

CROSS-REFERENCE TO RELATED APPLICATION

This application is a continuation of U.S. patent application Ser. No. 11/066,764, filed on Feb. 28, 2005 now U.S. Pat. No. 7,723,727, which is a continuation of U.S. patent application Ser. No. 09/935,158, filed on Aug. 23, 2001, now U.S. Pat. No. 6,870,588 which claims priority to and the benefit of Korean Patent Application No.: 2000-71681, filed on Nov. 29, 2000, which are all hereby incorporated by reference in their entireties for all purposes as if fully set forth herein.

BACKGROUND OF THE INVENTION (a) Field of the Invention

The present invention relates to a liquid crystal display and a substrate thereof, and more particularly, to a vertically aligned liquid crystal display and a substrate thereof in which pixel regions are divided into a plurality of small domains to obtain a wide viewing angle.

(b) Description of the Related Art

In a liquid crystal display (LCD), liquid crystal material is injected between an upper substrate, on which common electrodes and a color filter are formed, and a lower substrate, on which thin film transistors and pixel electrodes are formed. A voltage of a different potential is applied to the pixel electrodes and common electrodes to form an electric field, thereby varying the alignment of liquid crystal molecules of the liquid crystal material. In this way, the transmittance of incident light is controlled to enable the display of images.

However, a serious drawback of LCDs is their limited viewing angle. Various methods and configurations have been developed in an attempt to overcome this problem. In one method, the liquid crystal molecules are aligned perpendicularly to the upper and lower substrates, and either a predetermined aperture pattern or protrusions are formed on the pixel electrodes and the opposing common electrodes.

By forming the aperture patterns on the pixel electrodes and common electrodes, a fringe field is generated. Using the fringe field, a slanting direction of the liquid crystal molecules is controlled such that the viewing angle is increased. When there are formed protrusions on the pixel electrodes and common electrodes, on the other hand, an electric field distorted by the protrusions is used to control the slanting direction of the liquid crystal molecules. In an alternative method, aperture patterns are formed in the pixel electrodes provided on the lower substrate and protrusions are formed on the common electrodes provided on the upper substrate. Using a fringe field generated by the aperture pattern and protrusions, the slanting direction of the liquid crystal molecules is controlled to form domains.

However, in the above methods, dark portions where light is not transmitted appear in areas where the aperture patterns and protrusions are formed. As a result, if an area occupied by the aperture patterns and protrusions is excessively large, brightness is reduced. If the number of aperture patterns and protrusions is reduced in an attempt to remedy this problem, the ability to control the slanting of the liquid crystal molecules is reduced such than an uneven alignment results. Hence, texture is generated and extends over relatively large areas so that brightness is negatively affected, degrading overall picture quality.

SUMMARY OF THE INVENTION

The present invention has been made in an effort to solve the above problems.

It is an object of the present invention to provide a liquid crystal display in which the size of intervals between apertures or protrusions is optimized to improve the overall picture quality of the liquid crystal display.

To achieve the above object, the present invention provides a substrate for a liquid crystal display comprising first wires formed in one direction on the substrate; second wires intersecting and insulated from the first wires; pixel electrodes formed in pixel regions defined by the crossing of the first wires and the second wires; and switching elements connected to the first wires, the second wires and the pixel electrodes, wherein an interval between two adjacent second wires has a predetermined dimension that repeatedly varies from one set of adjacent second wires to the next, and a side of the pixel electrodes adjacent to the second wires is shaped in a pattern identical to the second wires such that the pixel electrodes have a wide portion and a narrow portion.

According to a feature of the present invention, the pixel electrodes include one or more first apertures dividing the narrow portion following a direction of the second wires, and one or more second apertures dividing the wide portion following a direction of the first wires.

According to another feature of the present invention, the substrate further comprises storage capacitance wires intersecting and insulated from the second wires, and including first branch wires and second branch wires overlapping the first apertures and the second apertures, respectively.

According to yet another feature of the present invention, the storage capacitance wires overlap a boundary between the narrow and wide portions of the pixel electrodes.

According to still yet another feature of the present invention, the first apertures divide the narrow portions of the pixel electrodes into two equal regions, and the second apertures divide the wide portions of the pixel electrodes into three regions, a center region of the three regions having a width twice or more than outer regions surrounding the center region.

In another aspect, the present invention provides a substrate for a liquid crystal display comprising an insulating substrate; gate lines formed on the insulating substrate; storage capacitance lines formed on the insulating substrate; a gate insulating layer formed over the gate lines and the storage capacitance lines; data lines formed on the gate insulating layer and intersecting the gate lines and the storage capacitance lines; a passivation layer formed over the data lines; and pixel electrodes formed on the passivation layer, the pixel electrodes having curved edges adjacent to the data lines to have a wide portion and a narrow portion.

According to a feature of the present invention, two adjacent pixel electrodes with data lines provided therebetween are arranged in an opposite manner, that is, alternating wide positions and narrow portions.

According to another feature of the present invention, the pixel electrodes include one or more first apertures for dividing the narrow portion following a direction of the data lines, and one or more second apertures for dividing the wide portion following a direction of the gate lines.

According to yet another feature of the present invention, the storage capacitance lines intersect and are insulated from the data lines, and include first branch lines and second branch lines overlapping the first and second apertures, respectively.

In yet another aspect, the present invention provides a liquid crystal display comprising a first substrate; first wires formed in one direction on the first substrate; second wires intersecting and insulated from the first wires; pixel electrodes formed in pixel regions defined by the crossing of the first wires and the second wires, and a side of the pixel electrodes adjacent to the second wires is shaped in a pattern identical to the second wires such that the pixel electrodes have a wide portion and a narrow portion; switching elements connected to the first wires, the second wires and the pixel electrodes; a second substrate provided opposing the first substrate; a black matrix formed on the second substrate; common electrodes formed on the second substrate; and domain controlling means for controlling the formation of domains of the pixel electrodes.

According to a feature of the present invention, the domain controlling means includes a first aperture pattern and a second aperture pattern formed respectively on the pixel electrodes and the common electrodes.

According to another feature of the present invention, the first aperture pattern includes first apertures that divide the narrow portions of the pixel electrodes into two equal regions and second apertures that divide the wide portions of the pixel electrodes into three regions, and the second aperture pattern includes third apertures overlapping the sides of the pixel electrodes in the narrow portions adjacent to the second wires, fourth apertures overlapping border regions of the wide portions of the pixel electrodes that are perpendicular to the second wires, and fifth apertures positioned in center portions between two fourth apertures.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
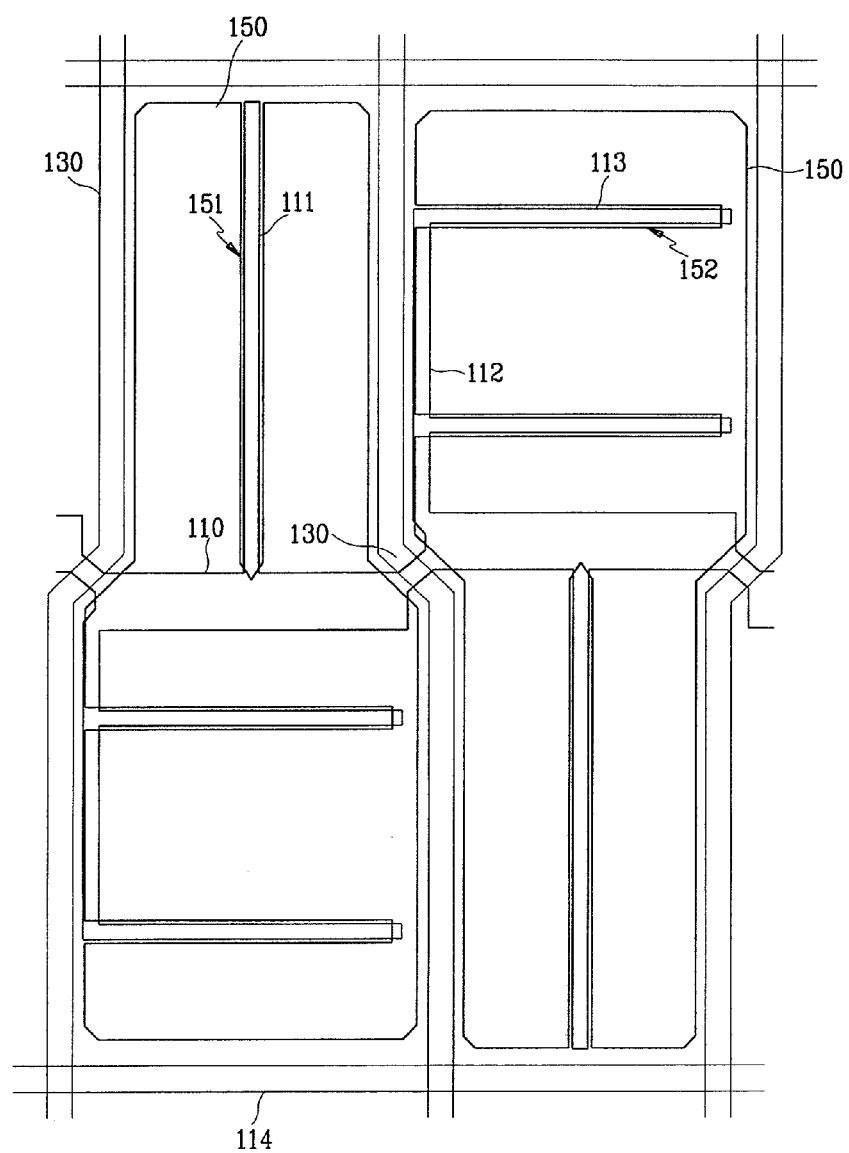
FIG. 1 is a schematic view of a thin film transistor substrate for a liquid crystal display according to a first preferred embodiment of the present invention.
Figure 2:
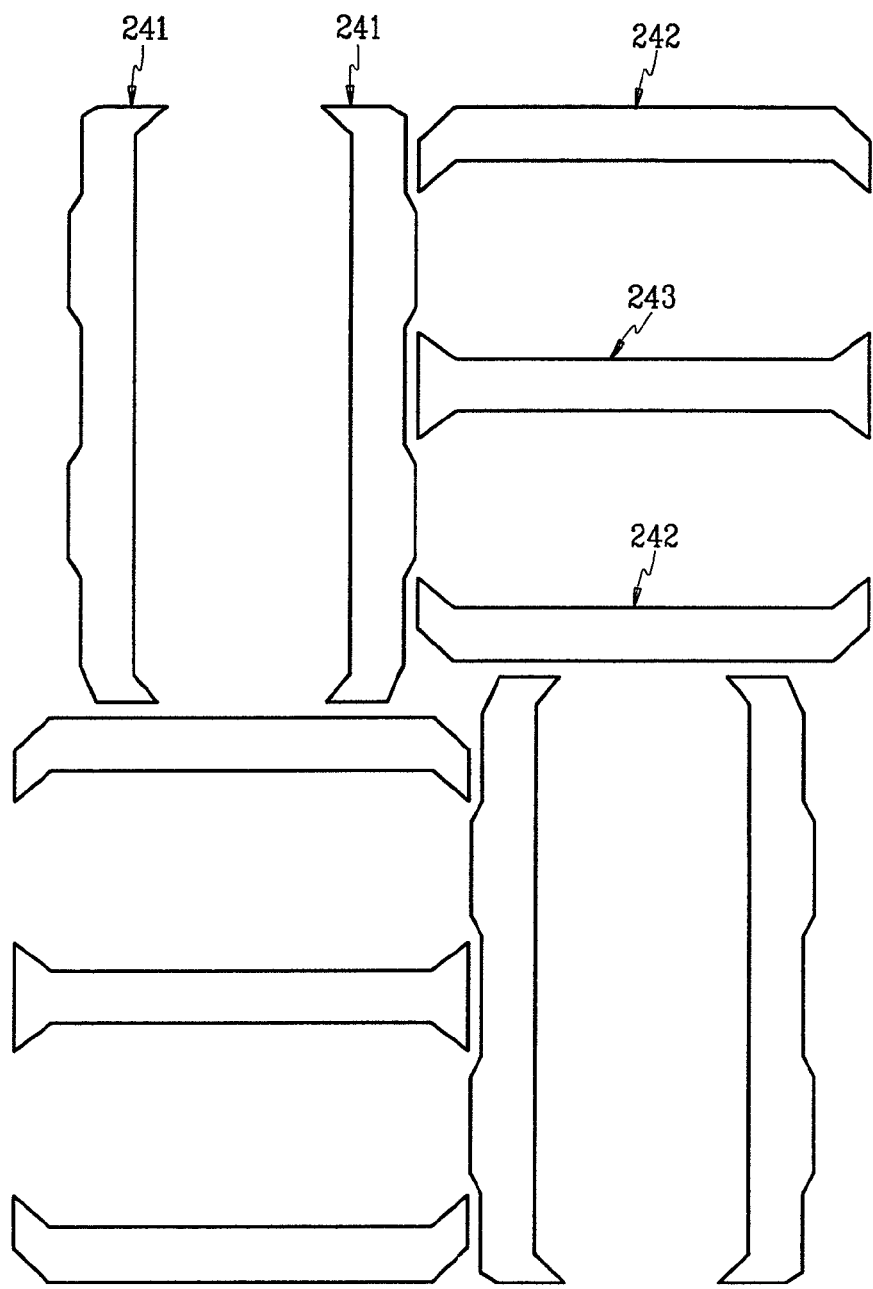
FIG. 2 is a schematic view of aperture patterns formed on common electrodes of a liquid crystal display according to a first preferred embodiment of the present invention.
Figure 3:
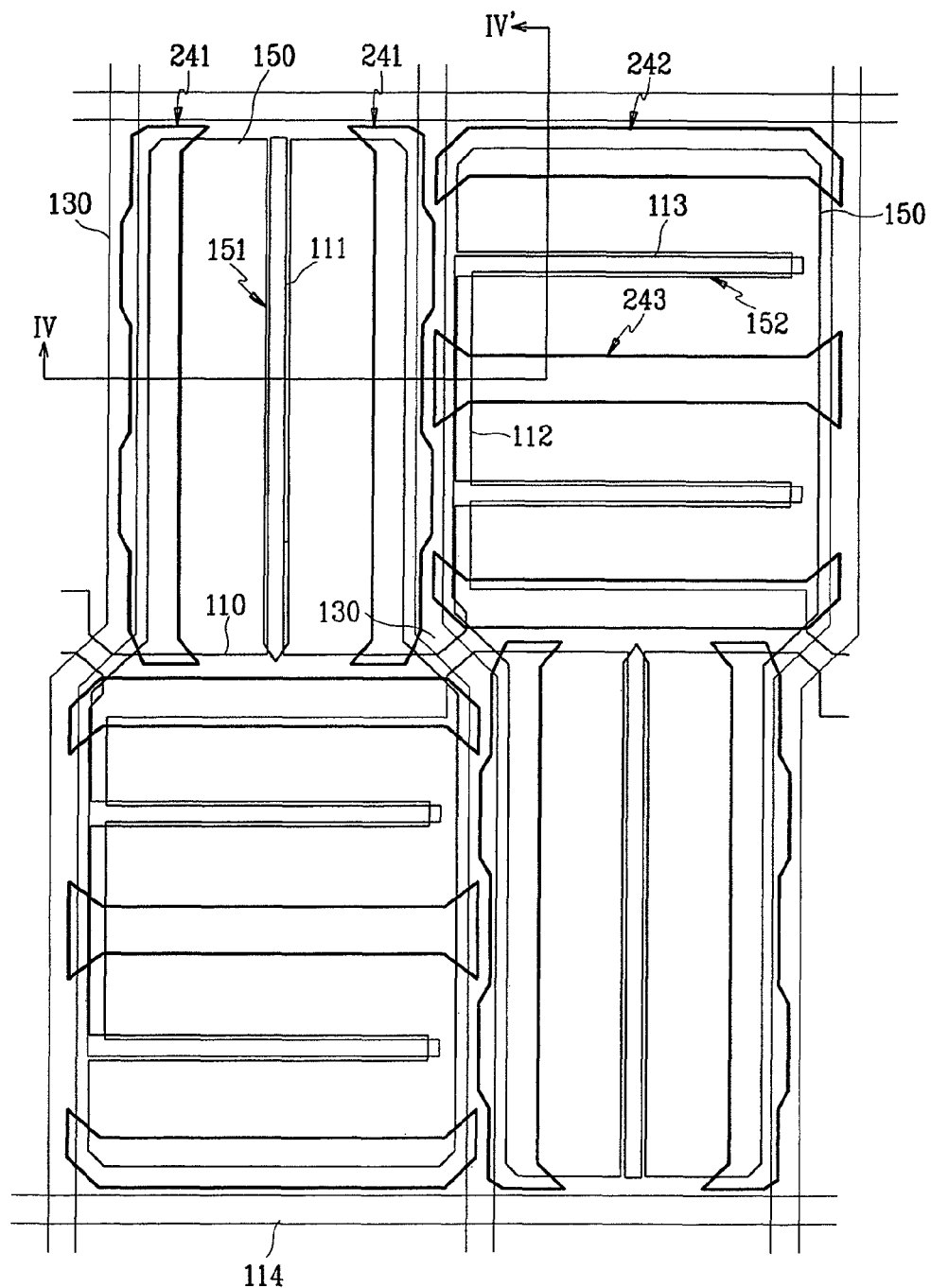
FIG. 3 is schematic plan view of pixel electrodes and aperture patterns of a liquid crystal display according to a first preferred embodiment of the present invention.
Figure 4:
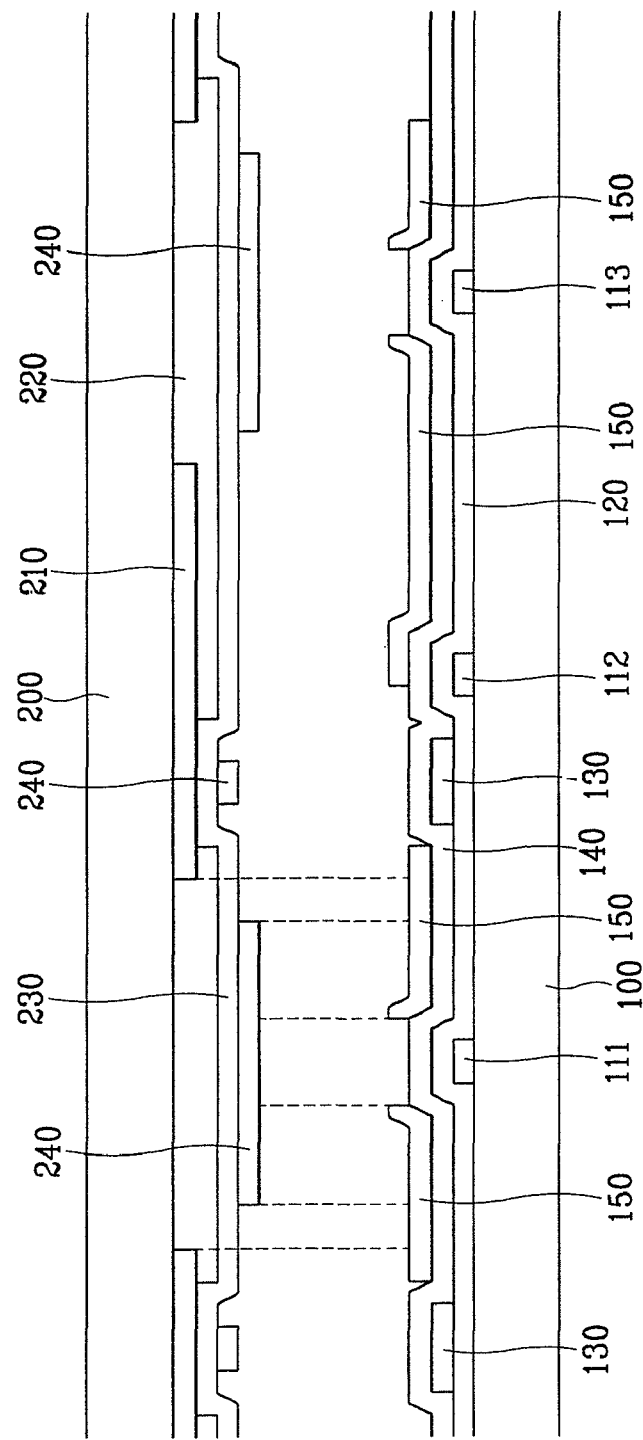
FIG. 4 is a schematic view taken along line IV-IV' of FIG. 3.

FIG. 1 shows a schematic view of a thin film transistor substrate for a liquid crystal display according to a first preferred embodiment of the present invention; FIG. 2 is a schematic view of aperture patterns formed on common electrodes of a liquid crystal display according to a first preferred embodiment of the present invention; FIG. 3 is schematic plan view of pixel electrodes and aperture patterns of a liquid crystal display according to a first preferred embodiment of the present invention; and FIG. 4 is a schematic view taken along line IV-IV' of FIG. 3.

With reference to the drawings, gate lines 114 are formed horizontally (in the drawings) on a lower substrate 100. A storage capacitance line 110 is formed in the same direction as the gate lines 114. That is, the storage capacitance line 110 includes thick portions formed above and below an imaginary horizontal line and connected by a connecting portion narrower than the thick portions. Vertically-extended first and second branch electrodes 111 and 112 are connected to the storage capacitance lines 110, and a third branch electrode 113 is connected to the second branch electrode 112, the third branch electrode 113 extending in a horizontal direction.

Formed over the gate lines 114 and the storage capacitance wiring 110, 111, 112 and 113 is a gate insulating layer 120. Data lines 130 are formed over the gate insulating layer 120 in a vertical direction (in the drawings). That is, each data line 130 has an upper and lower portion, and the upper portion is formed vertically on one side of an imaginary vertical line, while the lower portion is formed vertically on an opposing side of the same vertical line. The upper and lower portions of the data lines 130 are connected by connection portions. Preferably, a distance between imaginary lines extending from adjacent vertical edges of the data lines 130 is 3 µm~20 µm. Also, the data lines 130 are formed over the gate insulating layer 120 in an alternating manner, that is, with the upper and lower portions provided alternatingly to the right and left of the imaginary vertical lines. Accordingly, spaces between the data lines 130 vary between narrow positions and wide portions. The data lines 130 are formed crossing the storage capacitance lines 110 and the gate lines 114, with the crossing of the data lines 130 and the storage capacitance lines 110 occurring at the connection portions.

Formed over the data lines 130 is a passivation layer 140. Further, pixel electrodes 150 are formed on the passivation layer 140 and made of ITO (indium tin oxide) or IZO (indium zinc oxide). In more detail, a single pixel electrode 150 is provided in each pixel region defined by the crossing of a pair of gate lines 114 and data lines 130. Also, the pixel electrodes 150 are formed corresponding to the shape of the pixel regions, that is, corresponding to the alternating wide areas and narrow areas of the pixel regions. In the narrow areas of the pixel regions, the pixel electrodes 150 have a first aperture 151 extending vertically substantially the entire length of the narrow area of the pixel regions. In the wide areas of the pixel regions, the pixel electrodes 150 have a pair of second apertures 152, which extend horizontally. The first apertures 151 divide the pixel electrodes 150 in the narrow areas of the pixel regions roughly in half, and the second apertures 152 divide the pixel electrodes 150 in the wide areas of the pixel regions into three regions—two outer regions and a center region. The center region has a width approximately twice that of the outer regions. Further, the first apertures 151 overlap the first branch electrodes 111 of the storage capacitance line 110, and the second apertures 152 overlap the third branch electrodes 113 of the storage capacitance line 110.

A thin film transistor (not shown) is provided in each pixel region corresponding to the pixel electrodes 150. A gate electrode of the thin film transistors (TFTs) is connected to the gate lines 114, a source electrode of the TFTs is connected to the data lines 130, and a drain electrode of the TFTs is connected to the pixel electrodes 150. The source electrodes and drain electrodes are connected by a semiconductor layer, which forms channels.

A thin film transistor substrate and an opposing upper substrate will now be described with reference to FIGS. 2 and 4.

Formed on an inner surface of an insulation substrate 200 (or upper substrate) is a black matrix 210, and a red, green, blue color filter 220 is formed on the black matrix 210. Further, a passivation layer 230 is formed over the color filter 220, and a common electrode 240 is formed on the passivation layer 230. The common electrode 240 is made of a transparent conductive material such as ITO or IZO. An aperture pattern as shown in FIG. 2 is formed on the common electrode 240. The aperture pattern includes third apertures 241 extending vertically (in the drawing), and fourth and fifth apertures 242 and 243 extending horizontally (in the drawing), each fifth aperture 243 being formed between a pair of fourth apertures 242. The fourth and fifth apertures 242 and 243 are provided to the left and right of the third apertures 241, and outer edges of the third apertures 241 are indented corresponding to ends of the fourth and fifth apertures 242 and 243 to prevent contact between these two elements.

A structure of the thin film transistor substrate 100 and the upper substrate 200 in a combined state will now be described with reference to FIGS. 3 and 4.

The third apertures 241 overlap left and right sides of the narrow portions of the pixel electrodes 150, and the fourth apertures 242 overlap upper and lower edges of the wide portions of the pixel electrodes 150. The fifth apertures 243 are positioned substantially at a center area of the wide portions of the pixel electrodes 150. Accordingly, the narrow portions of the pixel electrodes 150 are divided into two small domains by the first apertures 151 and the third apertures 241, and the wide portions of the pixel electrodes 150 are divided into four small domains by the second apertures 152 and the fourth and fifth apertures 242 and 243. It is preferable that a width of the small domains is 20±5 μm. If the width of the small domains is too small, an aperture ratio is reduced, while too large domains weaken a fringe field and make it difficult to control the slanting direction of the liquid crystal molecules.

Figure 5:
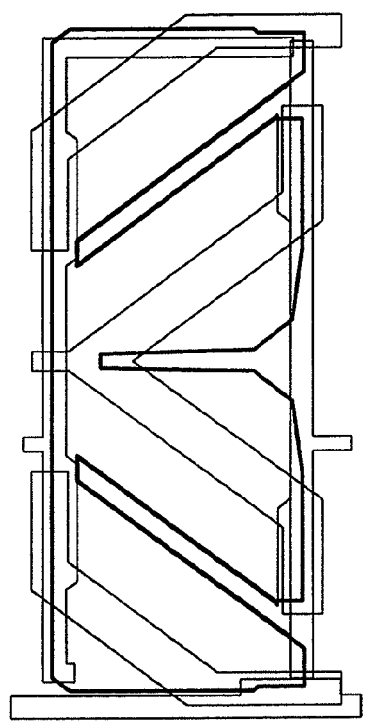
FIGS. 5 and 6 are schematic views showing examples of aperture patterns for increasing a viewing angle of a liquid crystal display.
Figure 6:
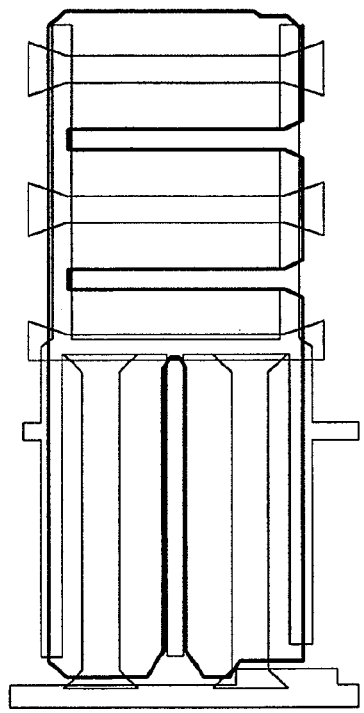

By forming the pixel electrodes 150 together with the apertures 151, 152, 241, 242 and 243 for the division of the pixel electrodes 150 into domains as described above, an aperture ratio that is significantly improved over the LCD employing aperture patterns as shown in FIGS. 5 and 6, for example, is obtained. That is, aperture ratios of 34% and 36% are realized with the aperture patterns of FIGS. 5 and 6, respectively, while an aperture ratio of 48% is realized with the aperture pattern according to the first preferred embodiment of the present invention. This is a result of the shape change in the pixel electrodes such that the width of the vertical and horizontal domains can be adjusted.

Further, with reference to FIGS. 5 and 6, if an H-shaped common electrode wire is arranged incorrectly during manufacture, a portion of the common electrode wire becomes present in an area of the pixel region through which light is transmitted. This decreases the aperture ratio. In the LCD of the present invention, on the other hand, the H-shaped common electrode wire is not used in order to prevent the occurrence of this problem. Further, the majority of the apertures 241, 242 and 243 formed on the common electrode are arranged at edges of the pixel regions to minimize a reduction in the aperture ratio. That is, the third apertures 241 are arranged overlapping the left and right sides of the narrow portions of the pixel electrodes 150, and the fourth apertures 242 are arranged overlapping the upper and lower parts of the wide portions of the pixel electrodes 150. These areas then become areas covered by the black matrix 210 or areas where the storage capacitance wires 110 are formed in order to prevent the leakage of light at the borders of these areas. Accordingly, the third and fourth apertures 241 and 242 do not additionally reduce the aperture ratio. Additionally, in the LCD of the present invention, the rectangular shapes of all the domains both increase in response speed and reduce the texture at the edges of the small domains.

Figure 7:
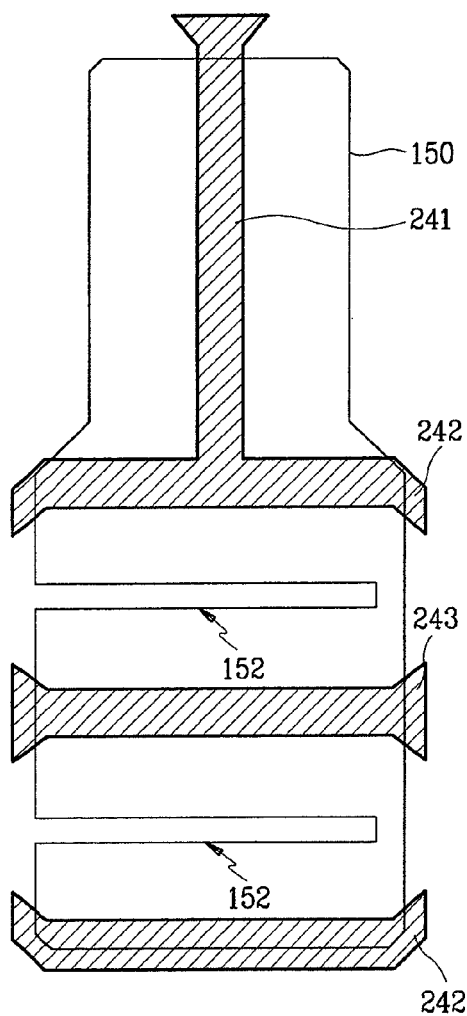
FIG. 7 is a schematic plan view of a pixel electrode and an aperture pattern for a liquid crystal display according to a second preferred embodiment of the present invention.

FIG. 7 shows a schematic plan view of a pixel electrode and an aperture pattern for a liquid crystal display according to a second preferred embodiment of the present invention. The LCD according to the second embodiment is identical to that of the first embodiment except for the shape of various elements. Accordingly, the same reference numerals will be used. Further, although only a single pixel region is shown in the drawing, it is to be assumed that each pixel region is configured in the same manner.

In the second embodiment, a pixel electrode 150 is divided into a narrow portion and a wide portion, identical to the first embodiment. Two second apertures 152 are formed in the wide portion of the pixel electrode 150 such that the wide portion is divided into three regions—a center region and two outer regions. The center region has a width at least twice that of the outer regions. Apertures formed on a common electrode (not shown) opposing the pixel electrode 150 include a third aperture 241 extending vertically (in the drawing), and fourth and fifth apertures 242 and 243 extending horizontally (in the drawing). The fifth aperture 243 is provided between the fourth apertures 242, and the third aperture 241 is connected to one of the two fourth apertures 242.

In a state where upper substrate and lower substrate of the LCD are positioned in an opposing manner, the third aperture 241 divides the narrow portion of the pixel electrode 150 into two equal regions, and the fourth apertures 242 are positioned at upper and lower boundaries of the wide portion of the pixel electrode 150. Further, the fifth aperture 243 is positioned dividing the wide portion of the pixel electrode 150 into two equal regions. Accordingly, the narrow portion of the pixel electrode 150 is divided into two small domains by the third aperture 241, and the wide portion of the pixel electrode 150 is divided into four small domains by the second apertures 152, the fourth apertures 242, and the fifth aperture 243. It is preferable that a width of the small domains is 20±5 μm. If the width of the small domains is too small, an aperture ratio is reduced, while too large domains weaken a fringe field and make it difficult to control the slanting direction of the liquid crystal molecules.

Figure 8:
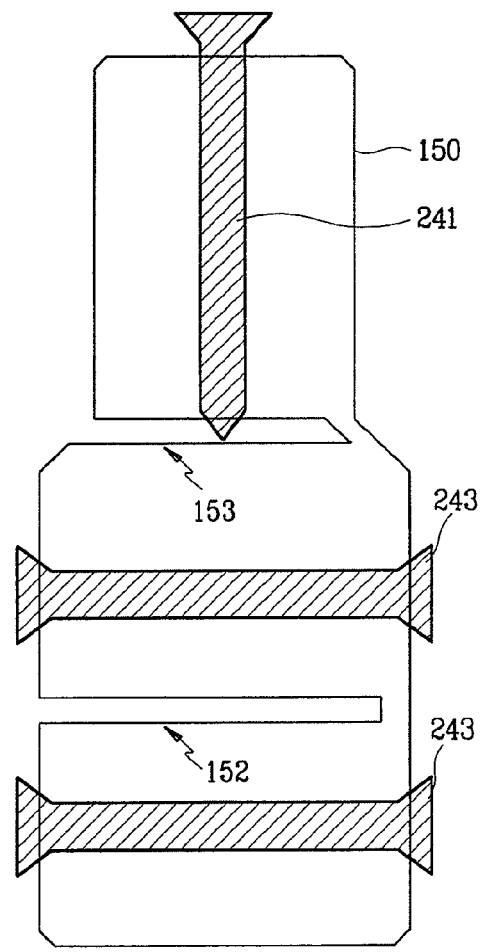
FIG. 8 is a schematic plan view of a pixel electrode and an aperture pattern for a liquid crystal display according to a third preferred embodiment of the present invention.

FIG. 8 shows a schematic plan view of a pixel electrode and an aperture pattern for a liquid crystal display according to a third preferred embodiment of the present invention. The LCD according to the third embodiment is identical to that of the first embodiment except for the shape of various elements. Accordingly, the same reference numerals will be used. Further, although only a single pixel region is shown in the drawing, it is to be assumed that each pixel region is configured in the same manner.

In the third embodiment, a pixel electrode 150 is divided into a narrow portion and a wide portion, identical to the first embodiment. A second aperture 152 is formed horizontally (in the drawing) in the wide portion of the pixel electrode 150, and a sixth aperture 153 is formed at the boundary between the narrow portion and the wide portion of the pixel electrode 150. The second aperture 152 divides the wide portion of the pixel electrode 150 into two regions. Apertures formed on a common electrode (not shown) opposing the pixel electrode 150 include a third aperture 241 extending vertically (in the drawing), and two fifth apertures 243 extending horizontally (in the drawing). The fifth apertures 243 are evenly spaced in the region corresponding to the wide portion of the pixel electrode 150.

In a state where upper substrate and lower substrate of the LCD are positioned in an opposing manner, the third aperture 241 divides the narrow portion of the pixel electrode 150 into two equal regions, and the fifth apertures 243 divide the wide portion of the pixel electrode 150 into three equal regions. Accordingly, the narrow portion of the pixel electrode 150 is divided into two small domains by the third aperture 241, and the wide portion of the pixel electrode 150 is divided into four small domains by the second apertures 152 and fifth apertures 243. It is preferable that a width of the small domains is 20±5 µm. If the width of the small domains is too small, an aperture ratio is reduced, while too large domains weaken a fringe field and make it difficult to control a slanting direction of the liquid crystal molecules.

In the LCD of the present invention structured as in the above, an aperture pattern is provided to optimize the intervals between apertures such that a wide viewing angle is obtained and the overall picture quality of the LCD is enhanced.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

For example, it is possible to form protrusions instead of the apertures. It is also possible to form a protrusion-aperture mixture, for example, apertures on the pixel electrodes and protrusions on the common electrodes.

What is claimed is:

1. A liquid crystal display comprising:
 a first substrate comprising a pixel region;
 a gate line transmitting a gate signal and extending in a first direction;
 a first data line transmitting a first image signal, wherein the first data line comprises at least two first vertical portions extending in a second direction substantially perpendicular to the first direction, and at least a first connection portion, wherein opposite ends of the first connection portion connect the first vertical portions, respectively, and the first connection portion is disposed at a first angle with respect to the first direction, and the first vertical portions are disposed in the left side of the pixel region; and
 a second data line transmitting a second image signal, wherein the second data line comprises at least two second vertical portions extending in the second direction and at least a second connection portion, wherein opposite ends of the second connection portion connects the second vertical portions, respectively, and the second connection portion is disposed at a second angle with respect to the first direction, and the second vertical portions are disposed in the right side of the pixel region.

2. The liquid crystal display of claim 1, wherein the first connection portion occupies a smaller portion than remaining portions of the first data line, and the second connection portion occupies a smaller portion than remaining portions of the second data line.

3. The liquid crystal display of claim 1, further comprising a pixel electrode disposed on the substrate.

4. The liquid crystal display of claim 3, wherein the pixel electrode has first and second edges shaped conformal to the first and second data lines, and third and fourth edges connected between the first edge and the second edge, and
 wherein the first and second data lines are arranged symmetrical with respect to a perpendicular bisector of one of the third and fourth edges.

5. The liquid crystal display of claim 3, wherein the pixel electrode has a wide portion and a narrow portion and is disposed between the first data line and the second data line.

6. The liquid crystal display of claim 3, further comprising:
 a common electrode transmitting a common voltage;
 a second substrate facing the first substrate;
 a liquid crystal layer disposed between the first substrate and the second substrate; and
 a domain formation member dividing the liquid crystal layer into a plurality of domains having different tilt directions.

7. The liquid crystal display of claim 6, wherein the domain formation member comprises a first aperture pattern on the pixel electrode.

8. The liquid crystal display of claim 7, wherein the first aperture pattern comprises a first aperture dividing the narrow portion into two equal regions.

9. The liquid crystal display of claim 8, wherein the pixel electrode has a wide portion and a narrow portion and is disposed between the first data line and the second data line; and
 wherein the first aperture pattern comprises second apertures dividing the wide portion into three regions.

10. The liquid crystal display of claim 6, wherein the domain formation member comprises a second aperture pattern on the common electrode.

11. The liquid crystal display of claim 10, wherein the pixel electrode has a wide portion and a narrow portion and is disposed between the first data line and the second data line, and
 wherein the second aperture pattern comprises third apertures overlapping edges of the narrow portion.

12. The liquid crystal display of claim 11, wherein the second aperture pattern comprises fourth apertures overlapping edges of the wide portion.

13. The liquid crystal display of claim 12, wherein the second aperture pattern comprises a fifth aperture positioned between fourth apertures.

14. The liquid crystal display of claim 6, further comprising a black matrix blocking light.

* * * * *